(12) United States Patent
Cowgill

(10) Patent No.: US 10,869,584 B1
(45) Date of Patent: Dec. 22, 2020

(54) MANUAL DEFROSTING IMPLEMENT

(71) Applicant: Ronnie A. Cowgill, Richland, WA (US)

(72) Inventor: Ronnie A. Cowgill, Richland, WA (US)

( * ) Notice: Subject to any disclaimer, the term of this patent is extended or adjusted under 35 U.S.C. 154(b) by 0 days.

(21) Appl. No.: 16/661,181

(22) Filed: Oct. 23, 2019

(51) Int. Cl.
*A47L 1/16* (2006.01)
*B60S 3/04* (2006.01)

(52) U.S. Cl.
CPC .................. *A47L 1/16* (2013.01); *B60S 3/045* (2013.01)

(58) Field of Classification Search
CPC ...... A47L 1/16; B60S 3/00; B60S 3/04; B60S 3/045; E01H 5/10
USPC ....... 15/104.001, 205, 330.2, 236.02; 37/230
See application file for complete search history.

(56) References Cited

U.S. PATENT DOCUMENTS

| 3,116,502 | A | 1/1964 | Gerber |
|---|---|---|---|
| 3,874,000 | A | 4/1975 | Altman |
| 4,538,320 | A | 9/1985 | Batt |
| 4,807,322 | A | 2/1989 | Littledeer |
| 5,050,596 | A | 9/1991 | Walasek et al. |
| 5,729,857 | A | 3/1998 | Martin et al. |
| D418,644 | S | 1/2000 | Bowden, III et al. |
| 6,757,930 | B2 | 7/2004 | Kajgana |
| 6,925,675 | B1 * | 8/2005 | Trunecek .................. A47L 1/16 15/236.01 |
| 7,043,768 | B2 | 5/2006 | Gogarty |
| D547,011 | S | 7/2007 | Schouten |
| 2010/0269284 | A1 * | 10/2010 | Power ....................... A47L 1/06 15/236.02 |

FOREIGN PATENT DOCUMENTS

EP 551024 * 7/1993

* cited by examiner

*Primary Examiner* — Mark Spisich
(74) *Attorney, Agent, or Firm* — Cramer Patent & Design, PLLC; Aaron R. Cramer

(57) ABSTRACT

A manual defrosting implement utilizes a handle having an attachment means capable of being removably secured to a resealable bag. The bag is capable of retaining a unit of hot liquid therein. A user manipulates the implement on an area where there is an accumulation of snow, frost, or ice for subsequent removal.

20 Claims, 4 Drawing Sheets

MANUAL DEFROSTING IMPLEMENT

RELATED APPLICATIONS

Not applicable.

FIELD OF THE INVENTION

The present invention relates to manual defrosting implement.

BACKGROUND OF THE INVENTION

Maintaining a clean automobile windshield is a necessary step in ensuring driving safety. This task is exceedingly difficult in those areas where cold weather seasons exist. While windshield wipers and washing spray do an adequate job of keeping the windshield area clean while driving, they cannot cope with huge frost, ice, and snow buildup that accumulate while the vehicle is parked. Situations such as this require the driver to get out an ice scraper and physically remove the buildup. This is not a pleasant task in freezing temperatures, as even gloved hands quickly become numb. Often, many drivers only clean a small spot in the center, just enough to see out. This results in a dangerous driving condition, not only for the driver, but any others who may be sharing the road with them. Furthermore, many drivers waste precious fuel warming up their automobile and risk theft by having their automobile stolen while warming up. Accordingly, a need has arisen for a means by which motorists can easily remove frost and ice buildup from motor vehicle windows in a simple and easy manner. The development of the windshield defrosting device fulfills this need.

SUMMARY OF THE INVENTION

The inventor has recognized the aforementioned, inherent problems and lack in the art and observed that there is a need for a new a window defrosting device, comprising an elongated handle having a ninety degree fitting, a proximal end of the elongated handle is provided with an ergonomic hand grip and a distal end of the ninety degree fitting terminates in a bearing plate. The bearing plate is permanently affixed to the ninety degree fitting. The device also comprises a sealing bag temporarily attached to the bearing plate by use of a fastener system; and a bag seal used to seal the sealing bag. The ergonomic hand grip and the elongated handle may be hollow to aid in weight savings. The elongated handle may be at least two feet long for use on a window of a passenger vehicle. The elongated handle may be as long as six feet or more for use on a window of a vehicle of a large truck while the ninety degree fitting may be made from plastic.

The elongated handle and the ninety degree fitting may be made from aluminum. The ergonomic hand grip is for user comfort with or without using of a pair of gloves. The bearing plate may be six square inches in size and may be made of aluminum to withstand use in cold temperatures. The bearing plate may be permanently affixed to the ninety degree fitting by a fastener selected from the group consisting of an adhesive, one or more welds, or one or more mechanical fasteners.

The sealing bag holds one quart of liquid and may be filled with hot water for defrosting purposes. The fastener system may allow for rapid engagement and disengagement of the sealing bag from the bearing plate. More than one of the sealing bags may be temporarily attached to the bearing plate by use of the fastener system.

A first fastener half of the fastener system may be attached to a first bag side surface of the sealing bag via adhesive. The fastener system may be a hook-and-loop-style system where the first fastener half is the loop side and the second fastener half is the hook side. A second fastener half of the fastener system may be attached to a second bag side surface of the sealing bag via adhesive.

The bag seal may be provided on a proximal side of the bearing plate. The bag seal may be provided on a distal side of the bearing plate.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
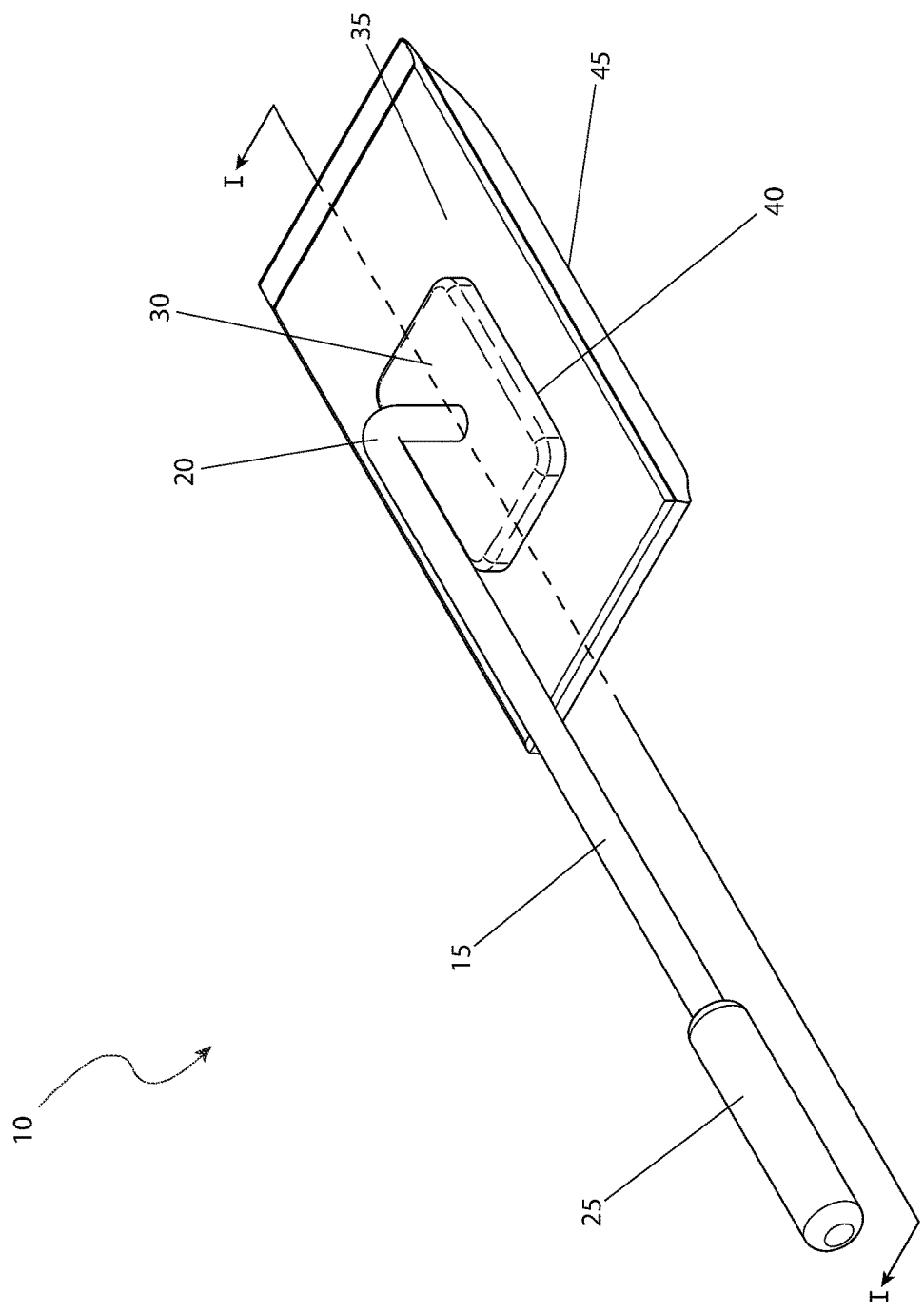
FIG. 1 is an isometric view of the window defrosting device 10, according to the preferred embodiment of the present invention.

DESCRIPTIVE KEY 10 window defrosting device
15 elongated handle
20 ninety degree (90°) fitting
25 ergonomic hand grip
30 bearing plate
35 sealing bag
40 fastener system
45 hot water
50 bag seal
55 first fastener half
60 bag side surface
65 adhesive
70 second fastener half
75 window
80 vehicle
85 ice/frost
90 user
95 ice/frost free area

DESCRIPTION OF THE PREFERRED EMBODIMENTS

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, an isometric view of the window defrosting device 10, according to the preferred embodiment of the present invention is disclosed. The window defrosting device 10 (herein also described as the "device") 10, includes an elongated handle 15 with a ninety degree (90°) fitting 20. The overall length of the elongated handle 15 is envisioned to be a minimum of two feet (2 ft.) for use on windows 75 of passenger vehicles 80 but can be as long as six feet (6 ft.) or more for use on windows 75 of vehicles 80 such as large trucks. As such, the overall length of the elongated handle 15 is not intended to be a limiting factor of the present invention. The combined elongated handle 15 and the ninety degree (90°) fitting 20 is envisioned to be manufactured from plastic, aluminum, or other suitable material. The proximal end of the elongated handle 15 is provided with an ergonomic hand grip 25 for user comfort with or without the use of gloves. The distal end of the ninety degree (90°) fitting 20 terminates in a bearing plate 30, envisioned to be approximately six square inches (6 in.$^2$) and made of aluminum or other suitable material to withstand use in cold temperatures. The bearing plate 30 is permanently affixed to the ninety degree (90°) fitting 20 by use of adhesive, welding, mechanical fasteners or the like. A sealing bag 35 envisioned to hold approximately one quart (1 qt.) of liquid is temporarily attached to the bearing plate 30 by use of a fastener system 40. Further description of the fastener system 40 will be provided herein below. During actual use of the device 10 for defrosting purposes, the sealing bag 35 is intended to be filled with hot water 45.

Figure 2:
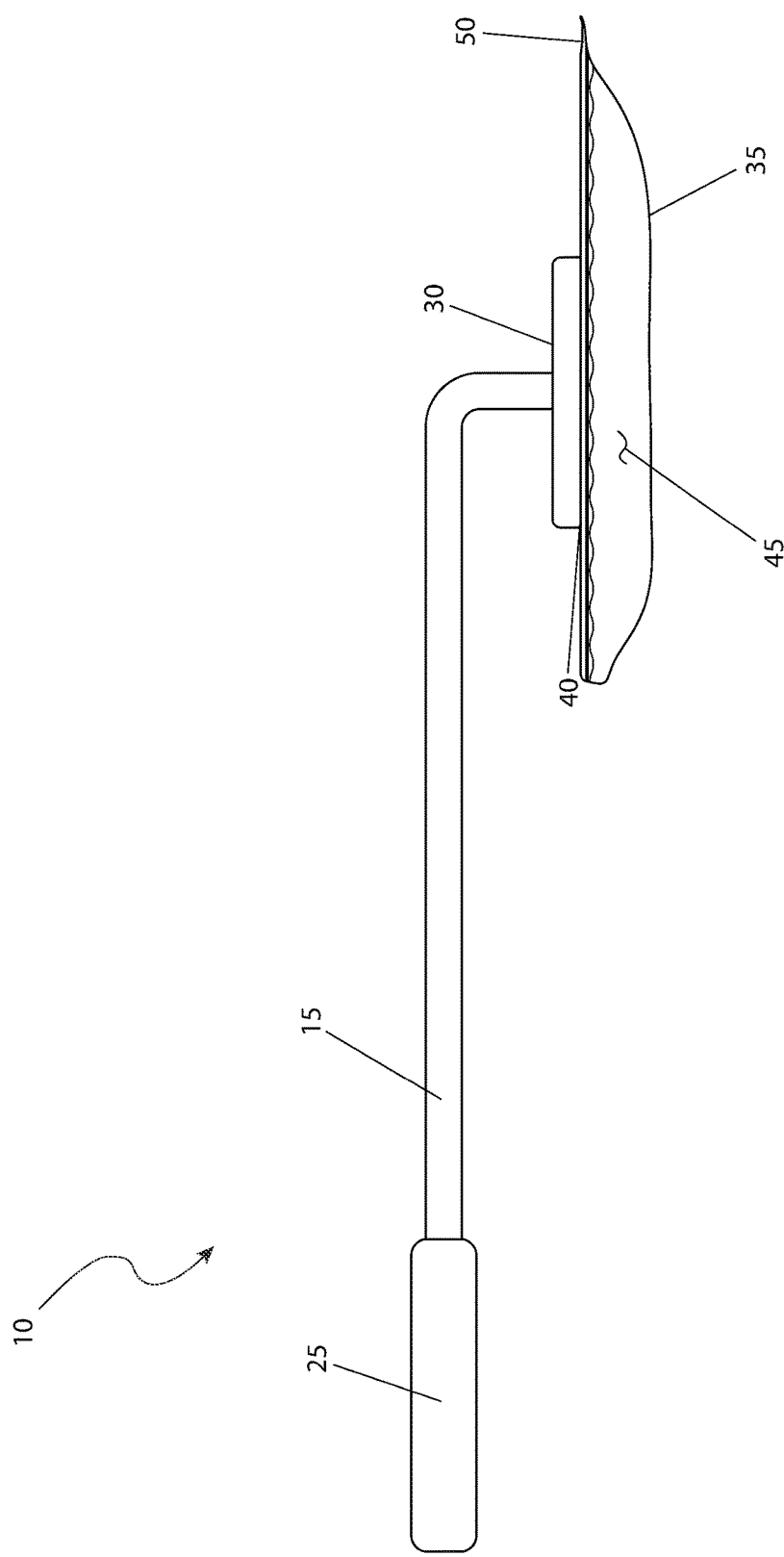
FIG. 2 is a sectional view of the window defrosting device 10, as seen along a line I-I, as shown in FIG. 1, according to the preferred embodiment of the present invention.

Referring next to FIG. 2, a sectional view of the device 10, as seen along a line I-I, as shown in FIG. 1, according to the preferred embodiment of the present invention is depicted. The sealing bag 35 presents a filled cross-section that is nearly full of hot water 45 when held in a horizontal position for use. The hot water 45 could be obtained from a hot water tap, by heating cold water or by any other means. A bag seal 50 used to seal the sealing bag 35 could be provided on either the proximal or distal side of the bearing plate 30. The fastener system 40 allows for rapid engagement and disengagement of the sealing bag 35 from the bearing plate 30. It is envisioned that multiple sealing bags 35 would be provided for use with the device 10. As the hot water 45 would need to be replenished with each subsequent use of the device 10 or replaced for use with large window areas 75 such as that found on trucks, buses, vans, or the like, the use of multiple sealing bags 35 will aid in this effort. Additionally, as the hot water 45 are used repeatedly, they are subject to failure through abrasion, accidental penetration, cuts, and the like, and would require periodic replacement. The ergonomic hand grip 25 and the elongated handle 15 are envisioned to be hollow to aid in weight savings. It is noted that the device 10 may be used in a horizontal position (as shown), in a vertical position, or any angle in between to account for differences in angles of the window 75 between different vehicle 80 manufacturers and/or for different angle grades that the subject vehicle 80 is parked upon.

Figure 3:
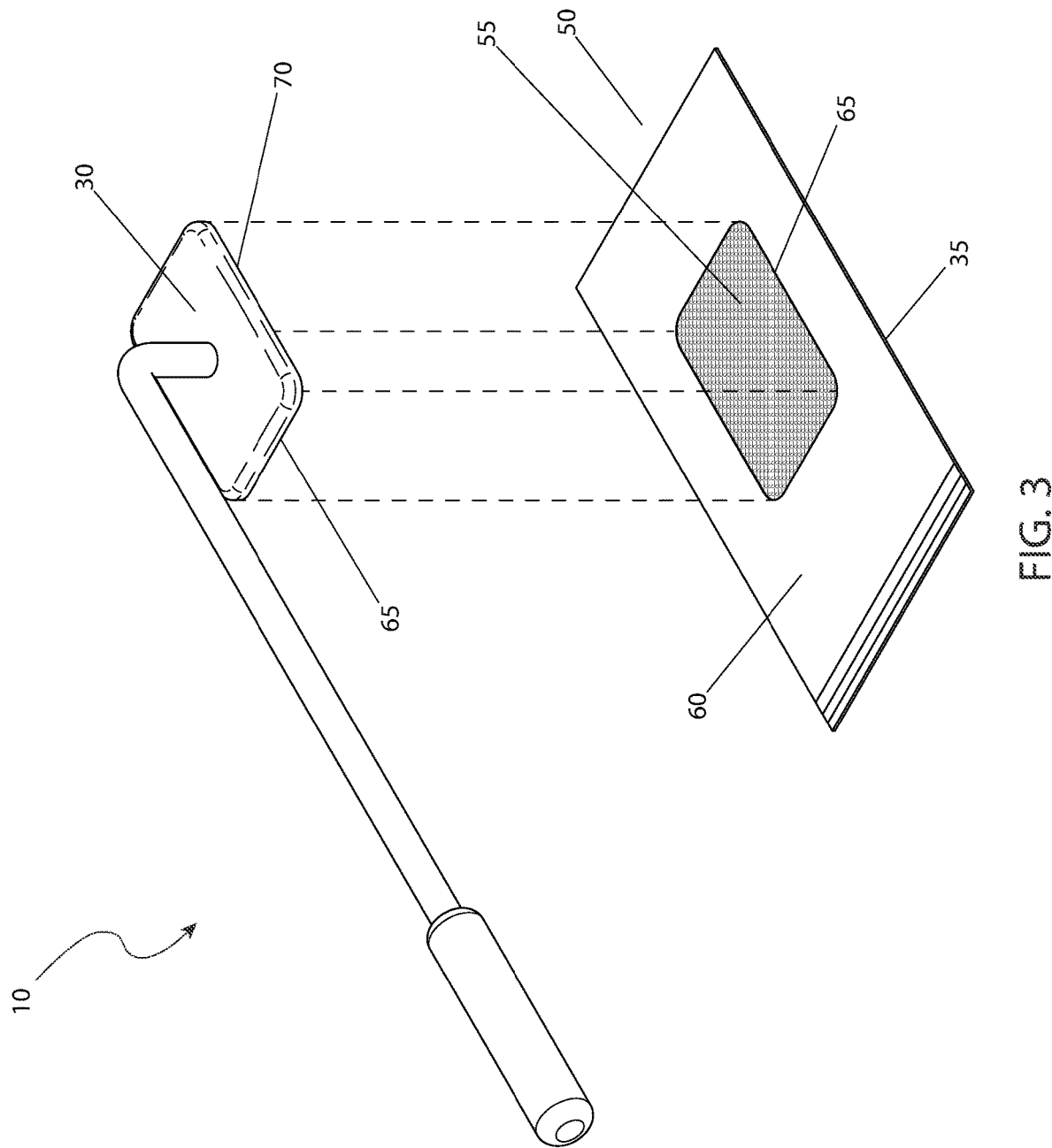
FIG. 3 is an exploded view of the window defrosting device 10, according to the preferred embodiment of the present invention; and, FIG. 4 is a perspective view of the window defrosting device 10, shown in a utilized state, according to the preferred embodiment of the present invention.

Referring now to FIG. 3, an exploded view of the device 10, according to the preferred embodiment of the present invention is shown. The sealing bag 35 is shown in an empty state for purposes of illustration. The bag seal 50 of the sealing bag 35 is located on the proximal side of the bearing plate 30 in contrast to the distal side as aforementioned described in FIG. 2. A first fastener half 55 of the fastener system 40 (as shown in FIG. 1 and FIG. 2) is envisioned to be attached to a bag side surface 60 of the sealing bag 35 via adhesive 65. Likewise, a second fastener half 70 of the fastener system 40 is envisioned to be attached to the bottom of the bearing plate 30 via adhesive 65 as well. The fastener system 40 is preferably a hook-and-loop-style system where the first fastener half 55 is the loop side and the second fastener half 70 is the hook side.

Figure 4:
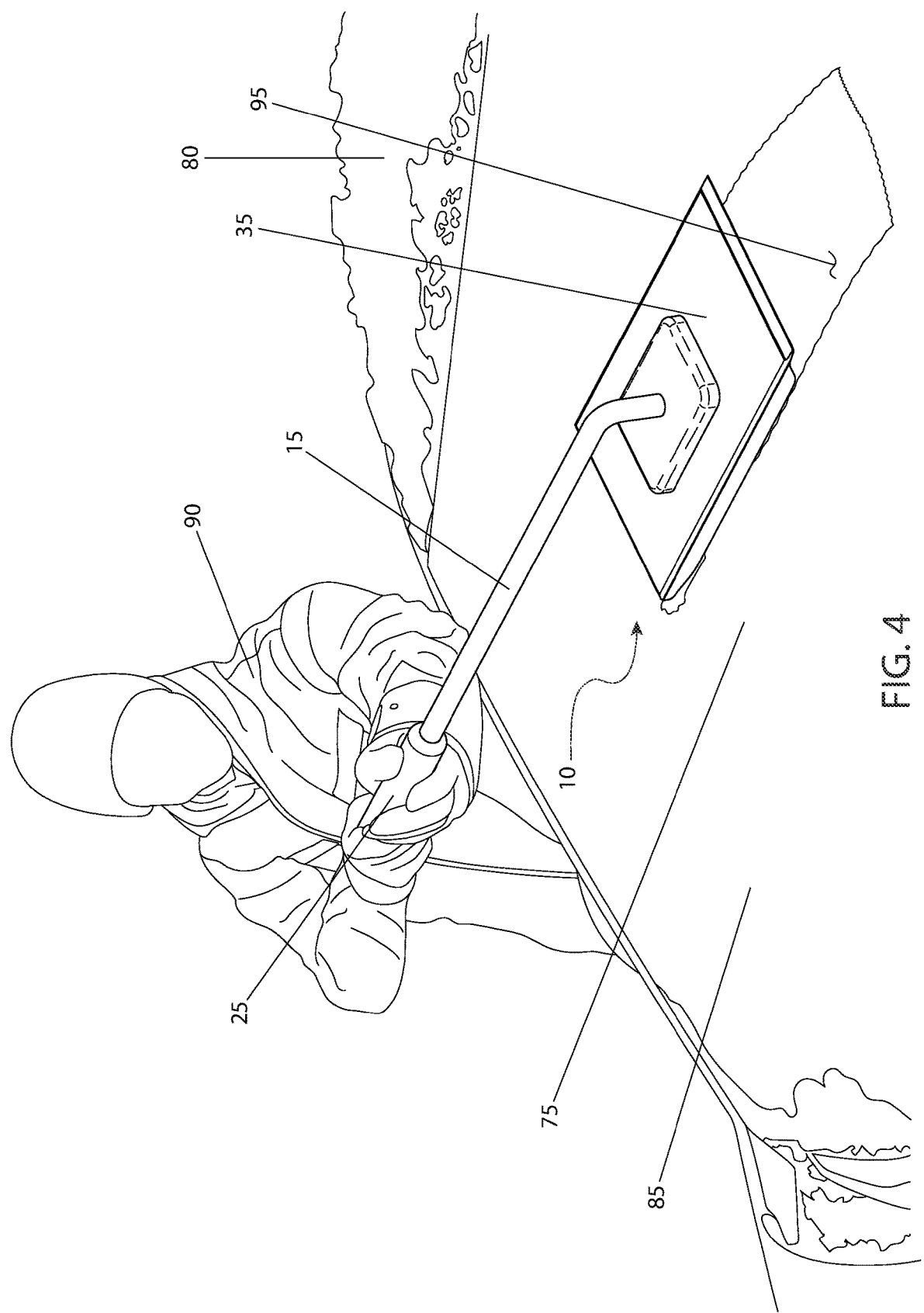

Referring to FIG. 4, a perspective view of the device 10, shown in a utilized state, according to the preferred embodiment of the present invention is disclosed. The device 10 is being used on a windshield 75 of a vehicle 80 that is coated with ice/frost 85. A user 90 grasps the device 10 by the ergonomic hand grip 25 and possibly the elongated handle 15. The sealing bag 35 is filled with hot water 45. Upon pushing and/or pulling the device 10 across the vehicle 80, an ice/frost free area 95 is generated, as the heat from the hot water 45 melts the subject ice/frost 85. This process is repeated as necessary on the remainder of the windshield 75 as well as side windows, rear windows, and even headlight and taillight areas.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 4. The user would procure the device 10 from conventional procurement channels, such as auto parts stores, discount stores, trucking accessory supply houses, internet and mail order supply houses, or the like. Special attention would be paid to overall length of the elongated handle 15, number of sealing bag 35 supplied with the device 10, availability of additional sealing bags 35 for purchase, and the like.

After procurement and prior to utilization, the windshield defrosting device 10 would be prepared in the following manner: the sealing bag 35 would be filled with hot water 45 from a tap, water that is heated on a stove, or the like; the bag seal 50 would be sealed shut, via mating together the first fastener half 55 and the second fastener half 70 of the fastener system 40. At this point in time, the device 10 is ready for use.

During utilization of the device 10, the following procedure would be initiated: the sealing bag 35 would be set upon the window 75 to be cleared of ice/frost 85. After momentary waiting for the ice/frost 85 to melt, the device 10, by means of the elongated handle 15 and the ergonomic hand grip 25, would slowly be pushed or pulled across the surface of the window 75. The speed of motion would depend on several factors, including, but not limited to: ambient temperature, temperature of the hot water 45, amount or thickness of the ice/frost 85 and the like. Should a large area of ice/frost 85 require removal, a large window 75 to be cleared of ice/frost 85 be encountered, additional sealing bags 35 would be required. The user 90 would remove the current sealing bag 35 by separating the fastener system 40 and applying the subsequent sealing bag 35 with refreshed hot water 45. This process would continue until all desired ice/frost 85 from the subject vehicle 80 is complete resulting in ice/frost free areas 95 as needed for safe driving.

After use of the device 10, it is prepared for future use as follows: any and all sealing bag 35 used are removed from the bearing plate 30 by separation of the fastener system 40; the hot water 45, now cooler, is emptied, and the sealing bag 35 allowed to air dry for future use in a repeating cyclical manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A window defrosting device, comprising:
   an elongated handle having a ninety degree fitting, a proximal end of the elongated handle is provided with an ergonomic hand grip and a distal end of the ninety degree fitting terminates in a bearing plate, the bearing plate is permanently affixed to the ninety degree fitting;
   a sealing bag configured to contain a heated fluid and temporarily attached to the bearing plate by use of a fastener system; and
   a bag seal used to seal the sealing bag.

2. The window defrosting device according to claim 1, wherein the ergonomic hand grip and the elongated handle are hollow to aid in weight savings.

3. The window defrosting device according to claim 1, wherein the elongated handle is at least two feet long for use on a window of a passenger vehicle.

4. The window defrosting device according to claim 1, wherein the elongated handle is as long as six feet or more for use on a window of a vehicle of a large truck.

5. The window defrosting device according to claim 1, wherein the elongated handle and the ninety degree fitting is made from plastic.

6. The window defrosting device according to claim 1, wherein the elongated handle and the ninety degree fitting is made from aluminum.

7. The window defrosting device according to claim 1, wherein the ergonomic hand grip is for user comfort with using of a pair of gloves.

8. The window defrosting device according to claim 1, wherein the ergonomic hand grip is for user comfort without using of a pair of gloves.

9. The window defrosting device according to claim 1, wherein the bearing plate is six square inches in size.

10. The window defrosting device according to claim 1, wherein the bearing plate is made of aluminum to withstand use in cold temperatures.

11. The window defrosting device according to claim 1, wherein the bearing plate is permanently affixed to the ninety degree fitting by a fastener selected from the group consisting of an adhesive, one or more welds, or one or more mechanical fasteners.

12. The window defrosting device according to claim 1, wherein the sealing bag holds one quart of liquid.

13. The window defrosting device according to claim 12, wherein the sealing bag is filled with hot water for defrosting purposes.

14. The window defrosting device according to claim 1, wherein the fastener system allows for rapid engagement and disengagement of the sealing bag from the bearing plate.

15. The window defrosting device according to claim 1, wherein more than one of the sealing bags are provided to temporarily attach a respective one the bearing plate by use of the fastener system.

16. The window defrosting device according to claim 1, wherein a first fastener half of the fastener system is attached to a first bag side surface of the sealing bag via adhesive.

17. The window defrosting device according to claim 16, wherein a second fastener half of the fastener system is attached to the bearing plate via adhesive.

18. The window defrosting device according to claim 1, wherein the fastener system is a hook-and-loop-style system where a first fastener half is the loop side and a second fastener half is the hook side.

19. The window defrosting device according to claim 1, wherein the bag seal is provided adjacent a proximal side of the bearing plate.

20. The window defrosting device according to claim 1, wherein the bag seal is provided adjacent a distal side of the bearing plate.

* * * * *